(12) United States Patent
Taylor

(10) Patent No.: US 10,736,299 B2
(45) Date of Patent: Aug. 11, 2020

(54) INTERLOCKING MODULAR ANIMAL TRAINING PAD TRAY

(71) Applicant: Adam Taylor, Bolton (CA)

(72) Inventor: Adam Taylor, Bolton (CA)

(73) Assignee: Pooch Patch Inc (CA)

(*) Notice: Subject to any disclaimer, the term of this patent is extended or adjusted under 35 U.S.C. 154(b) by 111 days.

(21) Appl. No.: 16/210,956

(22) Filed: Dec. 5, 2018

(65) Prior Publication Data

US 2020/0178490 A1 Jun. 11, 2020

(51) Int. Cl.
*A01K 1/01* (2006.01)
*B65D 1/34* (2006.01)

(52) U.S. Cl.
CPC ............... *A01K 1/0107* (2013.01); *B65D 1/34* (2013.01)

(58) Field of Classification Search
CPC ............................ A01K 1/0107; A01K 1/0125
See application file for complete search history.

(56) References Cited

U.S. PATENT DOCUMENTS

| | | | | |
|---|---|---|---|---|
| 5,142,733 A | * | 9/1992 | Mogel | A47G 27/0481 16/8 |
| 8,033,249 B1 | * | 10/2011 | Cook | A01K 1/0157 119/165 |
| 8,220,622 B1 | * | 7/2012 | Lewis | A01K 1/0107 119/168 |
| 8,656,863 B2 | * | 2/2014 | Havluciyan | A01K 1/0107 119/165 |
| 2002/0112669 A1 | * | 8/2002 | Holt, Jr. | A01K 1/0157 119/161 |
| 2006/0156992 A1 | * | 7/2006 | Costa | A01K 1/0107 119/161 |
| 2017/0196192 A1 | * | 7/2017 | Martin | A01K 1/0107 |

* cited by examiner

*Primary Examiner* — Sarah B McPartlin
(74) *Attorney, Agent, or Firm* — Christopher Pilling

(57) ABSTRACT

An interlocking modular animal training pad tray configured to interlock with one or more adjacent interlocking modular animal training pad trays while preventing leaking between the adjacent trays. The interlocking modular animal training pad tray having a modular body with four rigid sides forming a tray configured to hold an animal training pad. Each side of the four rigid sides including at least one fastening element.

1 Claim, 3 Drawing Sheets

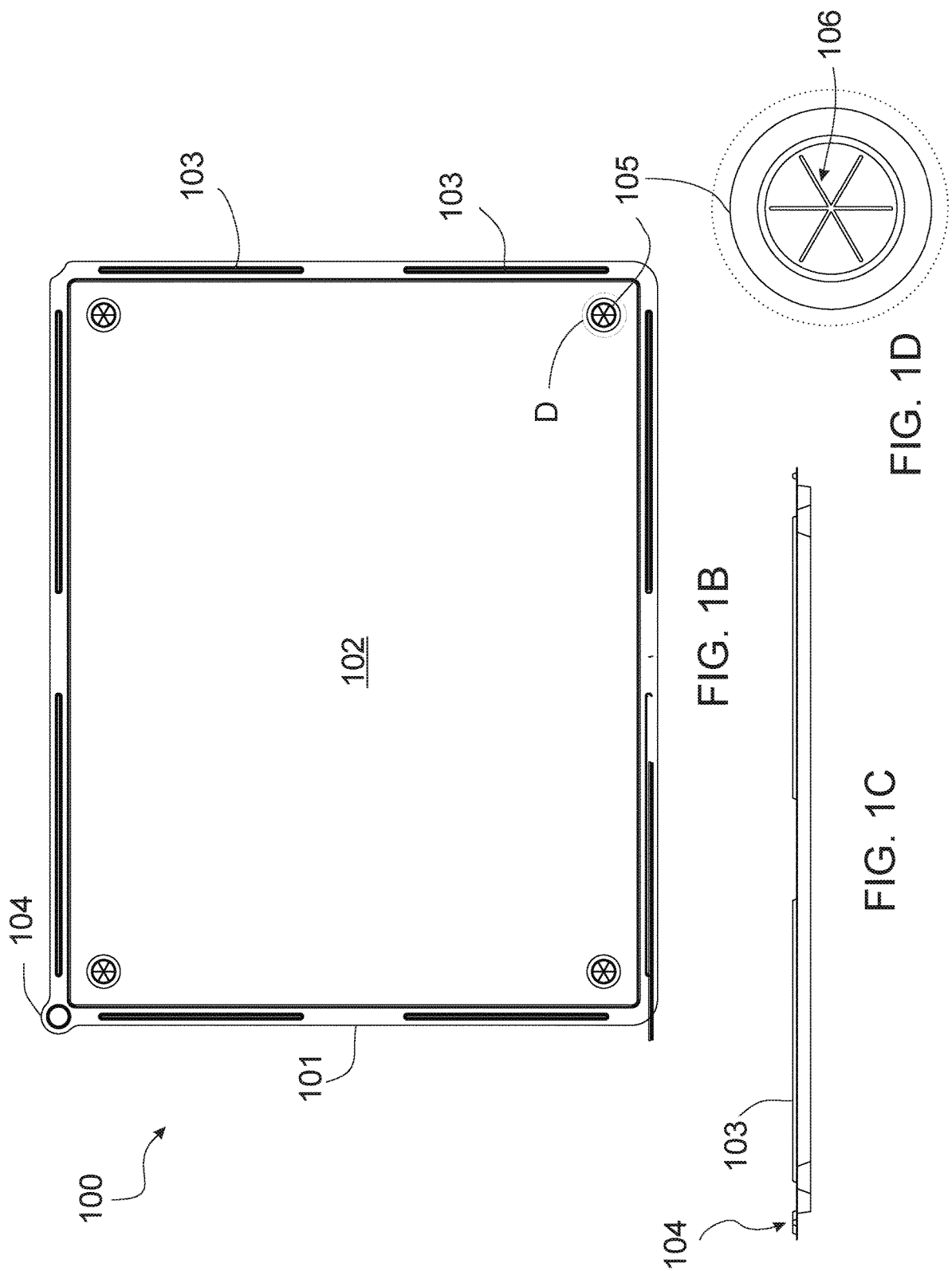

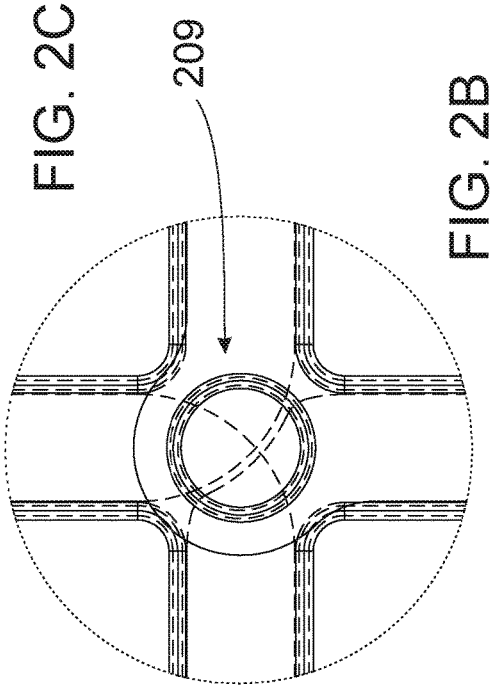
FIG. 2C
FIG. 2B
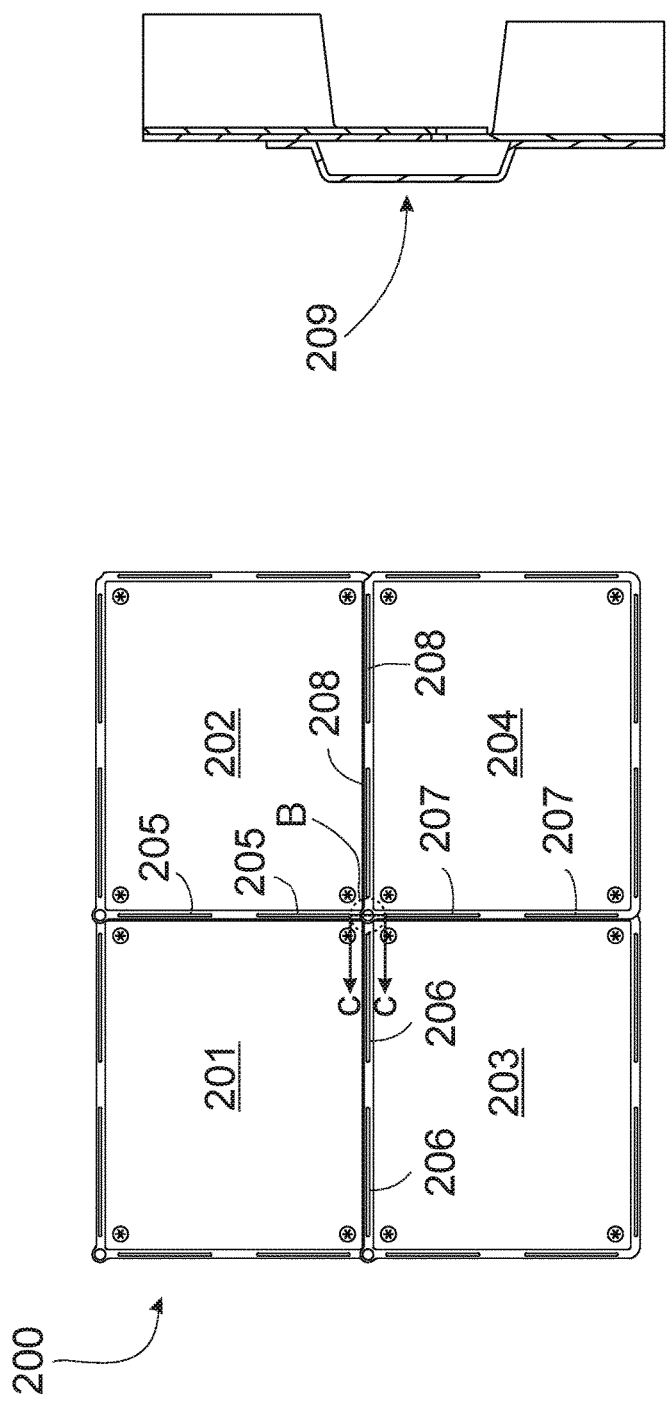
FIG. 2A

INTERLOCKING MODULAR ANIMAL TRAINING PAD TRAY

CROSS-REFERENCE TO RELATED APPLICATIONS

N/A

BACKGROUND OF THE INVENTION

1. Field of the Invention

The invention relates an interlocking modular animal training pad tray for animal toileting.

2. Description of Related Art

Dog training pads, usually called pee pads or potty pads, are devices used to aid in housebreaking a dog. Typically, the dog training pad is placed in a designated location inside a dwelling for indoor toileting. The concept of the training pad is to prevent accidents on floors and carpets inside the dwelling while the dog is becoming housebroken. By teaching the dog to use the training pad, a handler can easily transition from indoor toileting to outdoor toiling. However, there are many unmet needs with existing training pads, such as the generally size of the training pad as often accidents may occur next to the pads as the pads are sold in limited standard sizes. Consequently, there is a need for an interlocking modular animal training pad tray providing a larger training area.

BRIEF SUMMARY OF THE INVENTION

In aspect of the present invention, an interlocking modular animal training pad tray is provided, comprising a modular body having four rigid sides forming a tray configured to hold an animal training pad; each side of the four rigid sides including at least one fastening element; and, the interlocking modular animal training pad tray configured to be interlocked to a second interlocking modular animal training pad tray via the at least one fastening element such that the interlocked modular animal training pad trays are overlapped preventing leaking between trays.

In one embodiment, a connection element in a corner of the modular body where two of the four rigid sides intersect is provided. In another embodiment, the connection element is circular and is configured to prevent leaking between trays. In one embodiment, at least one pad securing member configured to secure the animal training pad. In another embodiment, the at least one pad securing member is four pad securing members, wherein each pad securing member is positioned in each corner of the tray. In yet another embodiment, the at least one fastening element is a protruding ridge configured to snap to a second protruding ridge of the second interlocking modular animal training pad tray. In one embodiment, the modular body is generally rectangular. In one embodiment, the modular body is constructed from plastic. In another embodiment, the interlocking modular animal training pad tray configured to be interlocked to a third interlocking modular animal training pad tray via the at least one fastening element.

In another aspect of the invention, an interlocking animal training tray system is provided, comprising at least four modular animal training trays, each modular animal training tray comprising a rectangular modular body having four rigid sides forming a tray configured to hold an animal training pad, wherein each side of the four rigid sides including a fastening element, and a circular connection element where two of the four rigid sides intersect; the at least four modular animal training trays interlocking with each other via the fastening elements and the circular connection element such that the fastening elements connects adjacent rigid sides of at least three modular animal training trays of the at least four modular animal training trays, wherein the circular connection element connects four modular animal training trays of the at least four modular animal training trays in a centralized location forming a large interconnected rectangular animal training tray system configured to hold at least four animal training pads; and, the at least four modular animal training trays overlapping to prevent leaking between adjacent trays.

BRIEF DESCRIPTION OF THE SEVERAL VIEWS OF THE DRAWINGS

Other features and advantages of the present invention will become apparent when the following detailed description is read in conjunction with the accompanying drawings, in which:

FIG. 1B is a top view of the interlocking modular animal training pad tray according to an embodiment of the present invention;

FIG. 1C is a front view of the interlocking modular animal training pad tray according to an embodiment of the present invention;

FIG. 1D is a detailed view of FIG. 1B.

FIG. 2A is a front view illustrating the interlocking arrangement of several trays forming a larger training area according to an embodiment of the present invention;

FIG. 2B is a detailed view of FIG. 2A; and,

FIG. 2C is a sectional view taking along section C-C of FIG. 2A.

DETAILED DESCRIPTION OF THE PREFERRED EMBODIMENT

Figure 1A:
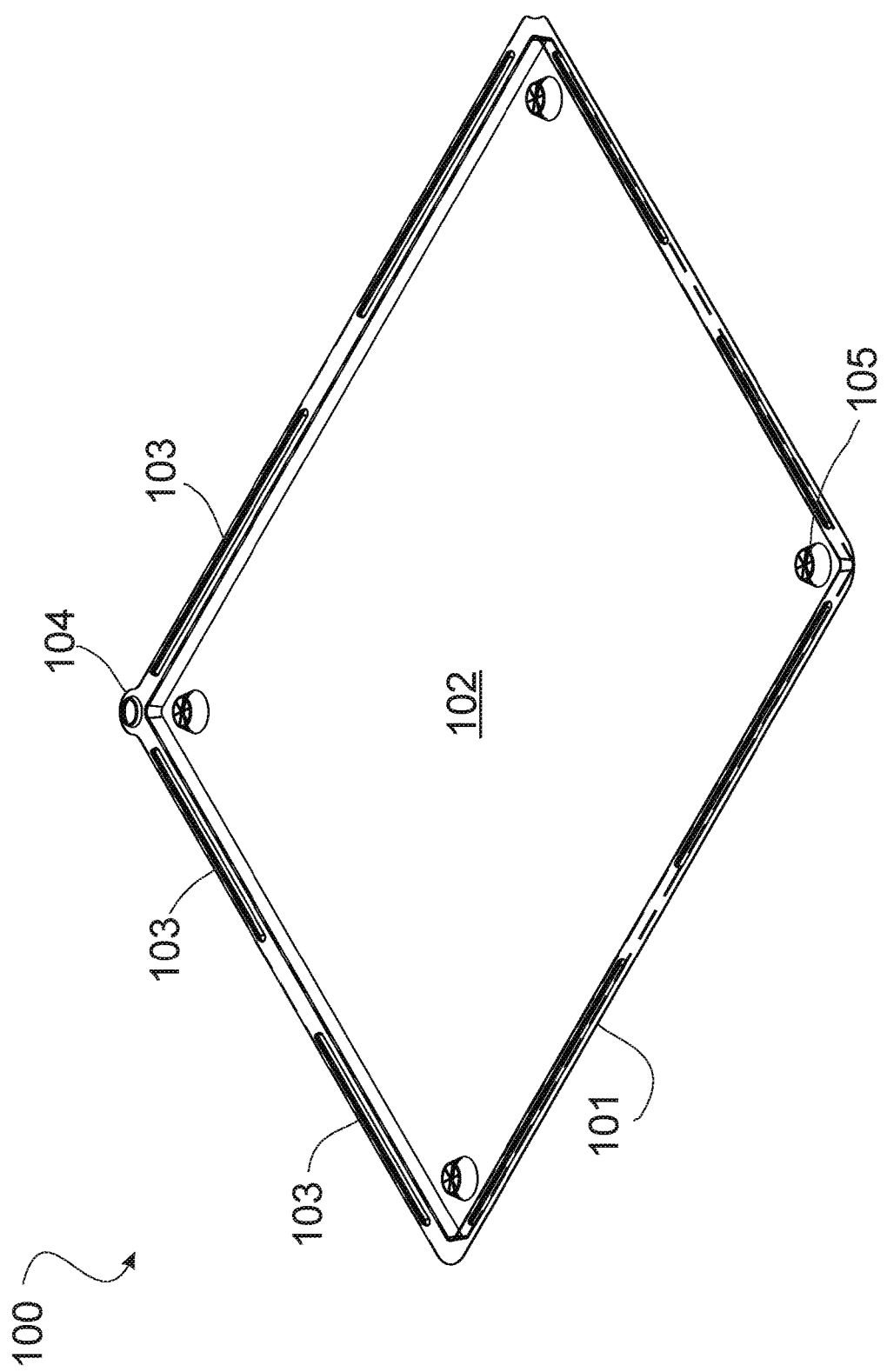
FIG. 1A is a perspective view of an interlocking modular animal training pad tray according to an embodiment of the present invention.

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide an interlocking modular animal training pad tray configured to interlock with one or more adjacent interlocking modular animal training pad trays while preventing leaking between the adjacent trays.

Referring now to FIGS. 1A-D an interlocking modular animal training pad tray 100 is illustrated. The interlocking modular animal training pad tray comprises a modular body 101 generally having four rigid sides forming a rectangular shape with rounded corners. The modular body forming a tray 102 configured to hold an animal training pad (not illustrated). In one embodiment, the tray size is approximately 27" by 21", however it is understood that the size may vary without departing from the scope of the invention. Preferably, the tray size corresponding to standard sized training pads. The animal training pads configured to retain animal toileting as well known in the art. In one embodiment, the modular body is constructed from plastic.

In one embodiment, each rigid size 101 includes at least one fastening element 103. In one embodiment, the fastening element is a protruding ridge configured to snap into another protruding ridge of an additional interlocking modular animal training pad tray. In one embodiment, a connection circular element 104 is provided in one corner of the modular body. These elements will be discussed in greater detail below.

In one embodiment, the tray includes at least one pad securing member 105 configured to secure the animal training pad in place. In one embodiment, the at least one pad securing member is positioned in the corner of the tray. Preferably, there are four pad securing members positioned in the four corners of the tray as illustrated. In one embodiment, the pad securing member includes a flexible material having wedges separated by slits such that when a user pushes the pad downward into the pad securing member the wedges flex downward and retract to grip and pinch the material of the pad. It should be understood that this is one example of the pad securing member and other known methods may be used.

Referring now to FIG. 2A, the interlocking arrangement of several trays forming a larger training area 200 is illustrated. In this exemplary instance, four modular interlocking modular animal training pad trays 201, 202, 203, and 204 are interlocked forming the larger training area. Each modular training pad tray being modular and identical in construction. In this example, trays 201 and 202 are interlocked via fastening elements 205, trays 201 and 203 are interlocked via fastening elements 206, trays 203 and 204 are interlocked via fastening elements 207, and trays 202 and 204 are interlocked via fastening elements 208. In this embodiment, the fastening elements are protruding ridges configured to overlap and snap into position interlocking two or more trays together. Best seen in FIGS. 2B-C, when the trays are interlocked, connection circular element 209 of tray 204 overlaps the adjacent trays in a centralized location between the four interlocking trays. It is a particular advantage of the present invention that the combination of the connection circular element and the fastening elements prevent leaking between trays, as there are no gaps for liquids to penetrate anywhere on the surface of each tray's modular body. As previously mentioned, it should be understood that the operation of the fastening elements may vary, however it is critical that when interlocking one or more trays, the trays overlap to prevent leaking.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. An interlocking animal training tray system comprising:

at least four modular animal training trays, each modular animal training tray comprising a rectangular modular body having four rigid sides forming a tray configured to hold an animal training pad, wherein each side of the four rigid sides including a fastening element, and a circular connection element where two of the four rigid sides intersect;

the at least four modular animal training trays interlocking with each other via the fastening elements and the circular connection element such that the fastening elements connects adjacent rigid sides of at least three modular animal training trays of the at least four modular animal training trays, wherein the circular connection element connects four modular animal training trays of the at least four modular animal training trays in a centralized location forming a large interconnected rectangular animal training tray system configured to hold at least four animal training pads; and, the at least four modular animal training trays overlapping to prevent leaking between adjacent trays.

* * * * *